United States Patent [19]
Stephan

[11] Patent Number: 5,220,835
[45] Date of Patent: Jun. 22, 1993

[54] TORSION BEAM ACCELEROMETER

[75] Inventor: Craig H. Stephan, Ann Arbor, Mich.

[73] Assignee: Ford Motor Company, Dearborn, Mich.

[21] Appl. No.: 758,133

[22] Filed: Sep. 12, 1991

[51] Int. Cl.⁵ .......................................... G01P 15/125
[52] U.S. Cl. .................................... 73/517 R; 73/514
[58] Field of Search ................ 73/517 R, 514, 517 B; 361/280, 283

[56] References Cited

U.S. PATENT DOCUMENTS

| 3,478,604 | 11/1969 | Evans | 73/517 R |
| 3,498,138 | 3/1970 | Stewart | 73/517 B |
| 4,483,194 | 11/1984 | Rudolf | 73/517 R |
| 4,598,585 | 7/1986 | Boxenhorn | 73/505 |
| 4,736,629 | 4/1988 | Cole | 73/517 R |

OTHER PUBLICATIONS

L. Spangler & K. D. Wise, "A New Silicon-on-Glass Procedure for Integrated Sensors," IEEE Sensor and Actuator Work Shop, Hilton Head, pp. 140-142, Jun. 1988.

Primary Examiner—John E. Chapman
Attorney, Agent, or Firm—Peter Abolins; Roger L. May

[57] ABSTRACT

A semiconductor accelerometer having a sensor element supported by a pedestal coupled to a substrate. Coupling between the pedestal and the sensor element includes opposing torsion beams along the axis of flexure coupled through a spring to the pedestal. The spring includes a pair of beams extending in a direction perpendicular to the torsion beams so that thermal expansion applies a tensile force to the torsion beams.

5 Claims, 2 Drawing Sheets

TORSION BEAM ACCELEROMETER

FIELD OF THE INVENTION

This invention relates to accelerometers, and, in particular, to micro-miniature, solid state accelerometers.

BACKGROUND OF THE INVENTION

There are known various very small, solid state accelerometers which can be used in acceleration sensors. Applications for such sensors include missile arming devices and actuators for airbags in automobiles Other known accelerometers for use in actuating airbags in motor vehicles are relatively complex devices which depend upon the movement of balls within the cylinder which is affected by fluid pressure and traveling friction.

U.S. Pat. No. 4,598,585 issued to Boxenhor teaches a planar inertial sensor with a sheet member having one inner planar element adapted for angular motion. A base member supports the peripheral region of a sheet member in a plane perpendicular to the Z axis. The sheet member encloses a first pair of opposed C shaped void regions disposed symmetrically about the Y axis and a common point where the X, Y, and Z axes intersect. The portions of the sheet member between the opposed ends of the void regions are flexible The portion of the sheet member interior to the void regions has a mass imbalance across the Y axis, i e , one side has more mass than the other.

U.S. Pat. No. 4,483,194 issued to Rudolf teaches an integrated accelerometer having a flap fixed to a carrier by two beams which are disposed symmetrically and in line with one side of the flap. An electrode deposited on a plate permits acceleration to be measured by measuring the corresponding variation in capacitance between the flap and the electrode. The two symmetrical attachment means operate in a torsion mode. The accelerometer is a semiconductor with a semiconductor carrier substrate and a semiconductor flap member The flap member in the attachment means is formed of a single thin piece of monocrystaline silicon.

U.S. Pat. No. 3,498,138 issued to Stewart teaches an accelerometer with a sensing member having a nonconductive wafer divided, by a slot, into radially interior and exterior portions. The exterior portion is support for rotation relative to the interior portion by a pair of flexible hinge members. Translation of the outer portion results in restoring forces tending to produce only translational displacement thereof. A servo system positions the exterior portion to a neutral position and includes magnetic means for super-imposing a permanent magnet's unidirectional field with a field produced by an electromagnet, to apply a restoring torquing force couple to the sensing member. The working air gap of the permanent magnet circuit is varied to compensate for changes in the characteristic of the magnet due to temperature variations.

U.S. Pat. No. 3,478,604 issued to Evans teaches a tapered cantilever beam composed of P type silicon which is mounted to lie on a plane substantially at a right angle to the direction of motion of a body and receives stress or pressure at its tip end which is applied by a moveable ball weight. On each face side of the beam is an N type epitaxial resistor wired into a circuit configuration to form a unijunction transistor. The flexing of the beam serves to vary the resistors in an opposite sense and to control a transistor connected into a relaxation oscillator circuit.

Further, various silicon accelerometers are known wherein a pedestal suspends a surrounding sensor member through two opposing torsion bars. However, if the longitudinal stress along a torsion beam becomes compressive instead of tensile the behavior of the beam can change, allowing the beam to bend more under load and perhaps even buckle. Such a structure is disclosed in U.S. Pat. No. 4,736,629. It would be desirable to avoid a compressive force in the torsion beam and, indeed, to build in tensile stress These are some of the problems this invention overcomes.

Referring in particular to FIG. 4 of U.S. Pat. No. 4,736,629, the illustrated structure isolates the torsion arms from substrate/pedestal stresses, but it does not, by itself, create a tension in them. Thus, if the electroplating process produces beams in compression, they will remain in the state. Further, the structure is asymmetric and under acceleration upward out of the plane of the page (referring to FIG. 4), the ring structure 116, being held only at the left side through beam 114, will bend downward toward the right, tilting the plate 128 with respect to the substrate. This will reduce the linearity of the device, i.e., the linearity of the change in capacitance with acceleration. Under some circumstances one corner of the plate could deflect enough to touch the substrate. Tilting can also increase the sensitivity of the device to acceleration in the plane of the device perpendicular to the axis of the torsion arms (though both rotation of the plate around the torsion arms and symmetric bending of the torsion arms will also tend to increase off-axis sensitivity).

Referring to prior art FIG. 1, the beams, (10,11) supporting the deflection plate (12) of a torsion beam accelerometer (13) should not be under compressive stress, since this can cause the beams to deflect or even buckle under acceleration. Compressive stress can be introduced either in the manufacturing process, or as a result of differential thermal expansion between the supporting pedestal and the substrate on which it rests. For example, assume that as a result of temperature changes, the material comprising the substrate (14) shown in FIG. 1 expands relative to the material forming the pedestal (15), torsion beams (10,11) and deflection plate (12). The pedestal (15) (assumed thin in relation to the substrate), being bonded to the substrate (14), will expand relative to the deflection plate (13), thereby compressing the torsion beams (10,11).

If the expansion coefficient of the substrate material is less than that of the deflection plate structure material, at ambient temperatures above the bonding temperature the beams will be in tension, and for ambient temperatures below the bonding temperature, they will be in compression. At temperatures above the bonding temperature, the plate will expand relative to the pedestal, which is constrained from expanding freely by the lower thermal expansion coefficient material forming the substrate. Therefore, the beams will be Placed in tension. At temperatures below the bonding temperature, the opposite will be true. If the bonding is done at high temperature, then the beams will always be in compression. This will be the case, for instance, in an embodiment where a patterned, boron-doped silicon wafer is anodically bonded to a glass wafer at 400° C., cooled, and then the undoped portion of the silicon etched away to leave behind the accelerometer structure (See L. Spangler and K. D. Wise, "A New Siliconon-Glass Procedure for Integrated Sensors", IEEE Sensor and Actuator Work Shop, Hilton Head, pp 140-142, June 1988, the disclosure of which is incorporated herein by reference).

SUMMARY OF THE INVENTION

This invention includes a torsion beam accelerometer structure in which a tensile stress is incorporated in the torsion beams in the manufacturing process. The structure includes a mounting scheme whereby a compressive stress induced in the mounting pedestal is converted to a tensile stress in the torsion beams. The invention provides for a means for determining the tensile stress in the torsion beams by geometrical factors rather than by material properties. This structure coupled with a high temperature anodic bonding process and the relative thermal expansion coefficients of glass and silicon, creates a tensile stress in the torsion arms.

By modifications to the geometry of this structure, one can design in the degree of isolation of the torsion arms from substrate/pedestal stresses induced by ambient temperature changes. This can be done both by choice of structure (e.g., circle vs. rectangle), and by changing the proportions of the various elements making up the ring structure (e.g., the widths and lengths of the perpendicular beams making up the rectangular ring). A structure offering a high degree of thermal isolation will create a correspondingly small amount of tensile stress in the torsion arms, and vice versa.

The accelerometer includes a mounting means positioned within an internal opening for mounting a sensing element on a substrate so that the sensing element is positioned above the substrate and can rotate about a flexure axis that is above and substantially parallel to the substrate, the mounting means including a pedestal mounted to the substrate and a spring means for elastically coupling the pedestal to a pair of torsion members, the pair of torsion members connected to the pedestal, and a pair of torsion members extending in opposite directions from the spring means to the sensing elements The spring means including a pair of members connecting the torsion means to the pedestal around internal openings of the spring means.

DETAILED DESCRIPTION OF THE INVENTION

Figure 1:
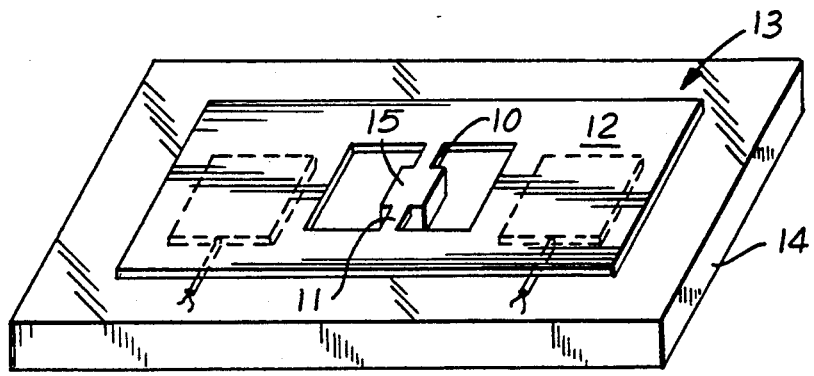
FIG. 1 is a top perspective view of a torsion beam accelerometer in accordance with the prior art.
Figure 2:
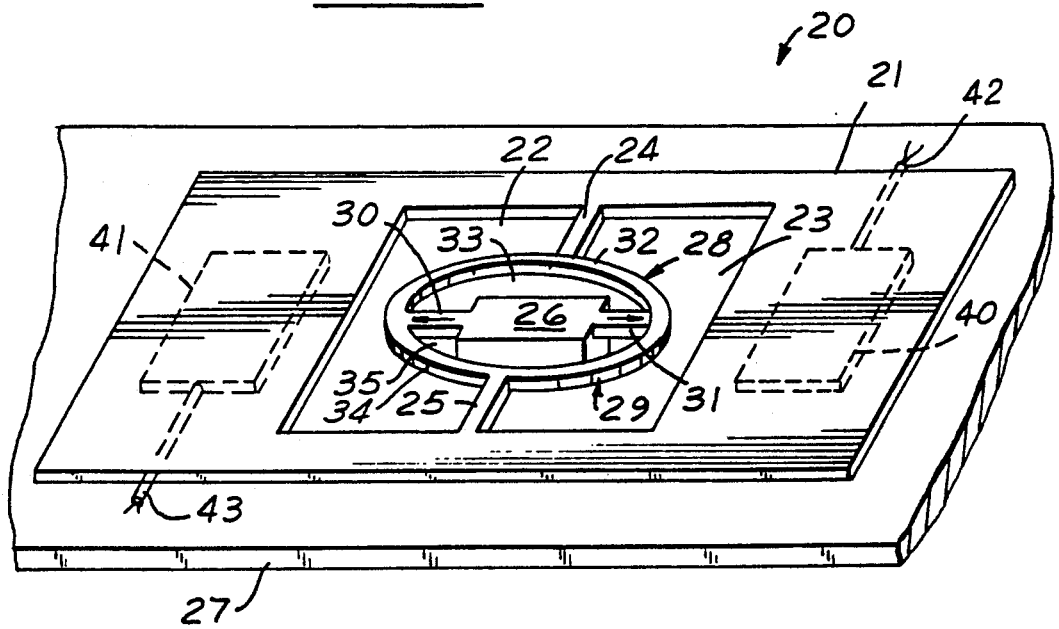
FIG. 2 is a top perspective view of a torsion beam accelerometer in accordance with an embodiment of this invention.
Figure 3:
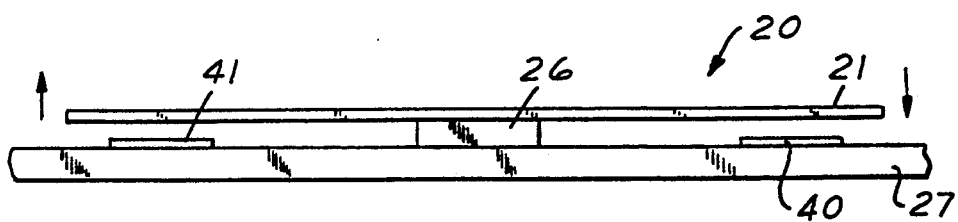
FIG. 3 is a side view of the accelerometer of FIG. 2.

Referring to FIGS. 2 and 3, an accelerometer 20 includes a deflection plate 21 with a first pair of opposing symmetrical interior openings 22 and 23 which are separated from each other by two torsion beams 24 and 25. A central pedestal 26 is mounted to a substrate 27 Pedestal 26 is coupled to the interior end of torsion beam 24 by a spring member 28. Pedestal 26 is coupled to the interior portion of torsion beam 25 by a spring member 29.

Spring members 28 and 29 include opposing support beams 30 and 31 extending in opposite directions from pedestal 26. Connecting the outer extremities of beams 30 and 31 to the inner portion of torsion beam 24 is a semicircular support 32 all of which together surround an opening 33. In a symmetrical arrangement, a support member 34 extends between the outer ends of beams 30 and 31 and connects to the inner portion of torsion beam 25 and surrounds an opening 35.

Deflection plate 21 faces capacitive plates 40 and 41 formed on substrate 27. Capacitive plates 40 and 41 have coupled to them electrical connections 42 and 43, respectively.

Figure 4:
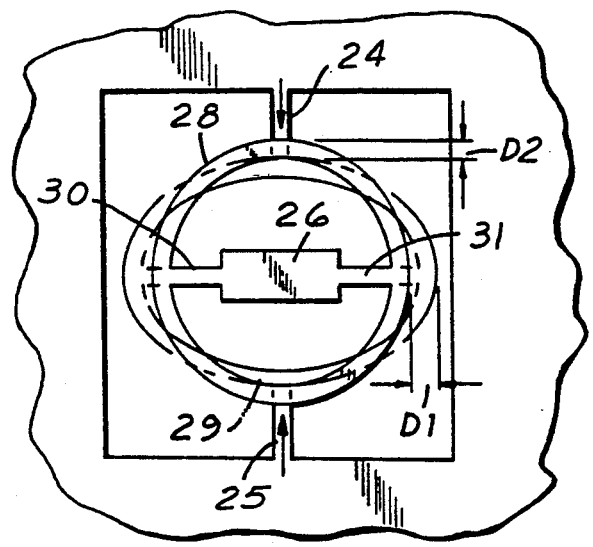
FIG. 4 is a top plan view of the accelerometer of FIG. 2 with a deflected position shown in dotted outline and arrows indicating the tensile force applied to the torsion members.

This invention teaches avoiding compressive stress and introducing a tensile stress in torsion beams 24 and 25 of accelerometer 20. This is accomplished even where bonding is done at an elevated temperature by using a supporting structure shown in FIG. 2. Deflection plate 21 is bonded to the substrate only through pedestal 26. As the temperature is reduced from the bonding temperature, pedestal 26 is expanded by substrate 27 relative to deflection plate 21 (see FIG. 4). That is, pedestal 26 cannot shrink in proportion to the rest of deflector plate 21. This relative expansion of pedestal 26 is transmitted through beams 30 and 31 to the ring structure of spring means 28 and 29 surrounding pedestal 26. As the originally circular shape of the ring is thereby deformed into an elliptical one, the diameter along beams 30 and 31 increases by an amount D1 at each end, and the perpendicular diameter decreases by an amount D2 at each end. As a result this creates a tensile stress in torsion beams 24 and 25.

Figures 5, 6:
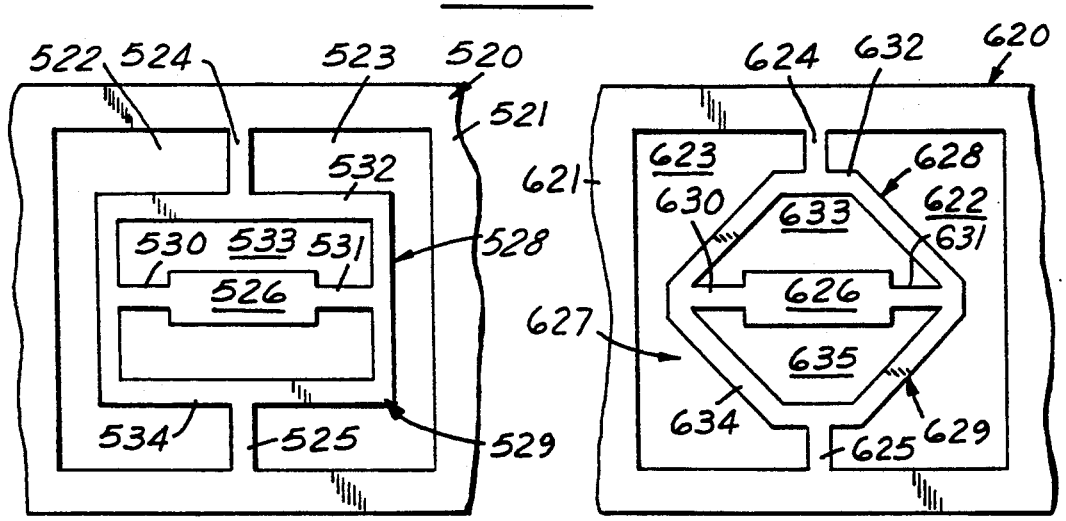
FIG. 5 is a plan view of another embodiment of this invention including a rectangular spring support.
FIG. 6 is another embodiment of this invention including a parallelogram spring means for mounting in accordance with an embodiment of this invention.

Other geometries for the ring structure are also possible. Referring to FIG. 5, an accelerometer 520 is similar to the accelerometer 20 of FIG. 2 except that spring members 28 and 29 are replaced by rectangularly shaped spring members 528 and 529. That is, a deflection plate 521 has a first pair of opposing symmetrical interior openings 522 and 523 which are separated from each other by two torsion beams 524 and 525. A central pedestal 526 is mounted to a substrate. Pedestal 526 is coupled to the interior end of torsion beam 524 by a spring member 528. Pedestal 526 is coupled to the interior portion of torsion beam 525 by a spring member 529. Spring members 528 and 529 include opposing support members 530 and 531 extending in opposite directions from pedestal 526. Connecting the outer extremities of beams 530 and 532 to the inner portion of torsion beam 524 is a rectangularly shaped support 532 which in combination surround an opening 533. In a symmetrical arrangement, a support member 534 extends between the outer ends of beams 530 and 531 and connects the inner portion of torsion beam 525 and surrounds an opening 535.

Referring to FIG. 6, an accelerometer 620 is similar to accelerometer 20 of FIG. 2 except that spring members 628 and 629 have a generally parallelogram or diamond shape. Accelerometer 620 includes a deflection plate 621 with a first pair of opposing symmetrical interior openings 622 and 623 which are separated from each other by two torsion beams 624 and 625. A central pedestal 626 is mounted to a substrate 627. Pedestal 626 is coupled to the interior end of torsion beam 624 by a spring member 628. Pedestal 626 is coupled to the interior portion of torsion, beam 625 by a spring member 629. Spring members 628 and 629 include opposing flex beams 630 and 631 extending in opposite directions from pedestal 626. Connecting the outer extremities of beams 630 and 631 to the inner portion of torsion beam 624 and extending around an opening 633 is a trapezoid shaped support 632. In a symmetrical arrangement, a support member 634 extends between the outer ends of beams 630 and 631 and connects to the inner portion of torsion beam 625 and surrounds an opening 635.

By means of a ring like structure, the magnitude of the tensile stress in torsion beams 24 and 25 (FIG. 2) can be determined by easily controllable geometrical factors (i.e., the length of the pedestal and the length, width, and thickness of the beams forming the ring structure). Also, the mounting is two-fold symmetric and there is no tendency for the accelerometer plate to twist during acceleration.

Figure 7:
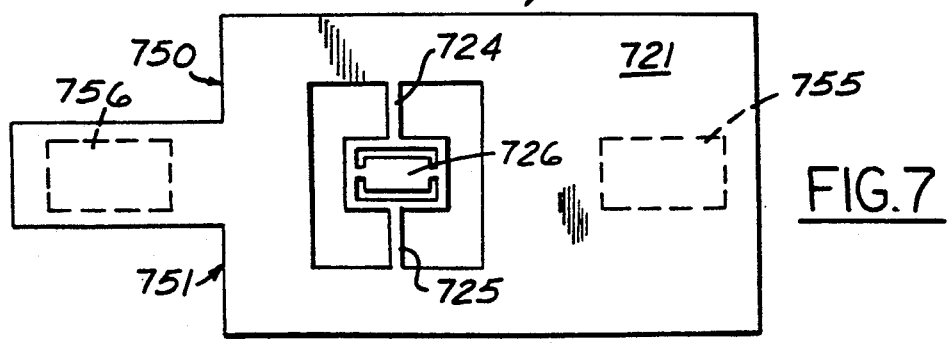
FIG. 7 is a plan view of an accelerometer in accordance with an embodiment of this invention wherein an imbalance in the sensor element is obtained by having cutouts from one side of the sensor member.

Referring to FIG. 7, an accelerometer 720 includes a deflection plate 721 connected through torsion beams 724 and 725 to a central pedestal 726. Defection plate 721 is asymmetrical with respect to pedestal 26 in that it is rectangular except for notches 750 and 751 which have been cut out from each corner of the left side of deflection plate 721. Thus there is more mass on the right side of deflection plate 721 than on the left side. Acceleration upwards (out of the plane of the paper) would tilt plate 721 such that the right hand side of plate 721 moves closer to electrode 755 and the left hand side moves the same distance further away from electrode 756. Thus, the capacitance between plate 721 and electrode 755 would be increased, and the capacitance between plate 721 and electrode 756 would be decreased by substantially the same amount. Acceleration downward would have the opposite effect.

Various modifications, and variations will no doubt occur to those skilled in the various arts which this invention pertains. For example, the size of the substrate and the relationship of the substrate to the sensor element may be varied from that disclosed herein. These and all other variations which basically rely on the teachings through which this disclosure has advanced the art are properly considered within the scope of this invention.

What is claimed is:

1. An accelerometer comprising:
   a substrate;
   a sensing element having at least a first internal opening;
   mounting means positioned within said first internal opening for mounting the sensing element on the substrate so that the sensing element is portioned above the substrate and can rotate about a flexure axis that is above and substantially parallel tot he substrate, the mounting means including a pedestal mounting to the substrate and a spring means for providing an elastic coupling connected to a the pedestal, and a pair of torsion members extending in opposite directions from the spring means to the sensing element;
   means for sensing rotation of the sensing element about the flexure axis;
   said spring means including a pair of members connecting said torsion members to said pedestal around a second and third internal opening to the spring means.

2. An accelerometer as recited in claim 1 wherein said spring means includes a pair of support beams extending in the direction away from the pedestal and perpendicular to said torsion beams and said pair of members includes flex members extending between the support beams and the torsion members.

3. An accelerometer as recited in claim 2 wherein said spring means has flex members with a generally circular shape.

4. An accelerometer as recite din claim 2 wherein said spring means has flex members with a generally rectangular shape.

5. An accelerometer as recited in claim 2 wherein said spring means has flex members with a generally diamond shape.

* * * * *